(12) United States Patent
Adamitskiy et al.

(10) Patent No.: US 10,576,370 B1
(45) Date of Patent: Mar. 3, 2020

(54) CLIENT DETECTION OF GAME-STATE PERFORMANCE FOR TRIGGERING GAME ASSIST

(71) Applicant: Electronic Arts Inc., Redwood City, CA (US)

(72) Inventors: Daniel Adamitskiy, Orlando, FL (US); Nickolaos Petris, Orlando, FL (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 16/179,834

(22) Filed: Nov. 2, 2018

(51) Int. Cl.
*A63F 13/358* (2014.01)
*A63F 13/85* (2014.01)
*A63F 13/79* (2014.01)

(52) U.S. Cl.
CPC .......... *A63F 13/358* (2014.09); *A63F 13/79* (2014.09); *A63F 13/85* (2014.09); *A63F 2300/535* (2013.01); *A63F 2300/5533* (2013.01); *A63F 2300/636* (2013.01)

(58) Field of Classification Search
CPC .......... A63F 13/10; A63F 13/12; A63F 13/30; A63F 13/31; A63F 13/32; A63F 13/327; A63F 13/33; A63F 13/332; A63F 13/335; A63F 13/34; A63F 13/35; A63F 13/352; A63F 13/355; A63F 13/358; A63F 13/44; A63F 13/493; A63F 13/77; G06F 13/161; G06F 2212/1024; G06F 2221/2109; G06F 2207/2272; G07F 17/32
See application file for complete search history.

(56) References Cited

U.S. PATENT DOCUMENTS

| | | | |
|---|---|---|---|
| 2012/0066405 A1* | 3/2012 | Speck | A63F 13/12 709/231 |
| 2014/0213367 A1* | 7/2014 | Fiedler | H04L 67/08 463/42 |
| 2016/0014437 A1* | 1/2016 | Perlman | H04N 21/2402 463/31 |

* cited by examiner

*Primary Examiner* — Omkar A Deodhar
(74) *Attorney, Agent, or Firm* — McDermott Will & Emery LLP

(57) ABSTRACT

Various aspects of the subject technology relate to systems, methods, and machine-readable media for improving multiplayer gameplay continuity. The disclosed method includes monitoring multiple buffers corresponding to multiple clients. The method also includes determining a first buffer is over a first threshold, the first buffer corresponding to a first client. The method also includes notifying the multiple clients that the first buffer of the first client is over the first threshold. The method also includes receiving a response from each of the clients, the response based on an in-game status. The method also includes pausing gameplays for each of the clients except the first client when the in-game status is favorable to pausing the gameplays for the first client.

20 Claims, 8 Drawing Sheets

400

| Scenario (Examples) | Save User? |
|---|---|
| In Play-call | Yes |
| Middle of a play or kick meter showing (impact other user's performance/reaction) | No |
| Recovering a user has cumulatively taken longer than 1 minute of game time | No |
| Saved that user 3 times already this game | No |

FIG. 4

SYSTEM CONFIGURATION

| Server Configured Setting | Description |
|---|---|
| Version | Allows for multiple versions of the settings to exist at one time |
| Enabled | Whether system is enabled |
| Allow During Play | Catch a player up in the middle of a play |
| Allow During Kick | Catch a player up during a kick |
| Enabled in H2H | If the system is enabled in H2H modes |
| Enabled in OTP/Squads | If the system is enabled in OTP/Squads modes |
| Max recoveries per user H2H | Max number of times we can save a user per H2H game |
| Max recoveries per user OTP/Squads | Max number of times we can save a user per OTP/Squads game |
| Max recovery time | Max amount of time to recover per catchup instance before continuing the game (helps prevent grieving) |
| Notify at fault user | Whether to notify the user |
| Catchup threshold | How far behind a user must be on the server for the game to signal for catchup |
| At fault text | Message |
| No fault H2H text | Message shown to the user that's waiting for a user to catch up in H2H |
| No fault OTP/Squads text | Message shown to the user that's waiting for a user to catch up in OTP/Squads |

SYSTEM CONFIGURATION CONTINUED...

| Server Configured Setting | Description |
|---|---|
| Threshold to notify user in trouble | Determines the severity for a user to be falling behind in order to notify them that they're falling behind |
| Enable latency icon | Whether a latency icon can be shown in game |
| Not great threshold for latency icon | How far behind a user must be before the game shows connection isn't great |
| Bad threshold for latency icon | How far behind a user must be before the game shows connection is bad/at risk of needing catchup |
| Max catchup time per user per game | Rather than max number of catchup instances per user, allow each user an amount of time to catchup per game |
| Resync enabled | Whether games can utilize the resync system |
| Max resyncs per user in H2H | Max times a user is allowed to resync into a H2H game |
| Max resyncs per user in OTP/Squads | Max times a user is allowed to resync into a OTP/Squads game |
| Resync on disconnect | Whether a user can resync after a disconnect in game has occurred |
| Resync on desync | Whether a user can resync after a desync in game has occurred |
| Resync on crash | Whether a user can resync after a crash in game has occurred |
| Matchmake into existing game | Whether a user can matchmake into a game that is already in progress |
| Spectator enabled | Whether a user can opt to spectate a game instead of resync to join and play in the game |

FIG. 5B

CLIENT DETECTION OF GAME-STATE PERFORMANCE FOR TRIGGERING GAME ASSIST

TECHNICAL FIELD

The present disclosure generally relates to client detection of game-state performance, and more particularly to triggering in-game assists for preventing user disconnection.

BACKGROUND

Conventional video games do not provide adequate support for network disconnects in multiplayer games. In a situation where one player of a multiplayer game disconnects from the game, the entire game will abruptly end for all players involved. This is because all users playing the game share controller data with each other in order for the game to continue processing. Additionally, a gameplay disconnection will also occur for all players when network traffic of a player goes silent for a certain period of time, even though that player has not been disconnected. Therefore, there is a need for improved gameplay support for addressing potential network issues of players in a multiplayer game.

SUMMARY

Various aspects of the subject technology relate to systems, methods, and machine-readable media for improving multiplayer gameplay continuity. By monitoring a game-state of a player and detecting when a user is falling behind, the user may be allowed to recover without affecting other users in a game session. A user's risk of disconnecting may also be assessed to determine if a game should be stopped or paused until the user can rejoin.

According to one embodiment of the present disclosure, a computer-implemented method for improving multiplayer gameplay continuity is provided. The method includes monitoring multiple buffers corresponding to multiple clients. The method also includes determining a first buffer is over a first threshold, the first buffer corresponding to a first client. The method also includes notifying the multiple clients that the first buffer of the first client is over the first threshold. The method also includes receiving a response from each of the clients, the response based on an in-game status. The method also includes pausing gameplays for each of the clients except the first client when the in-game status is favorable to pausing the gameplays for the first client.

According to one embodiment of the present disclosure, a system is provided including a processor and a memory comprising instructions stored thereon, which when executed by the processor, cause the processor to perform a method for improving multiplayer gameplay continuity. The method includes monitoring multiple buffers corresponding to multiple clients. The method also includes determining a first buffer is over a first threshold, the first buffer corresponding to a first client. The method also includes notifying the multiple clients that the first buffer of the first client is over the first threshold. The method also includes receiving a response from each of the clients, the response based on an in-game status. The method also includes pausing gameplays for each of the clients except the first client when the in-game status is favorable to pausing the gameplays for the first client.

According to one embodiment of the present disclosure, a non-transitory computer readable storage medium is provided including instructions (e.g., stored sequences of instructions) that, when executed by a processor, cause the processor to perform a method for improving multiplayer gameplay continuity. The method includes monitoring multiple buffers corresponding to multiple clients. The method also includes determining a first buffer is over a first threshold, the first buffer corresponding to a first client. The method also includes notifying the multiple clients that the first buffer of the first client is over the first threshold. The method also includes receiving a response from each of the clients, the response based on an in-game status. The method also includes pausing gameplays for each of the clients except the first client when the in-game status is favorable to pausing the gameplays for the first client.

According to one embodiment of the present disclosure, a system is provided that includes means for storing instructions, and means for executing the stored instructions that, when executed by the means, cause the means to perform a method. The method includes monitoring multiple buffers corresponding to multiple clients. The method also includes determining a first buffer is over a first threshold, the first buffer corresponding to a first client. The method also includes notifying the multiple clients that the first buffer of the first client is over the first threshold. The method also includes receiving a response from each of the clients, the response based on an in-game status. The method also includes pausing gameplays for each of the clients except the first client when the in-game status is favorable to pausing the gameplays for the first client.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 4 is an example chart of in-game status scenarios, according to certain aspects of the disclosure.

FIGS. 5A-5B illustrate example configurations for implementing the example systems of FIGS. 1-3.

Figure 1:
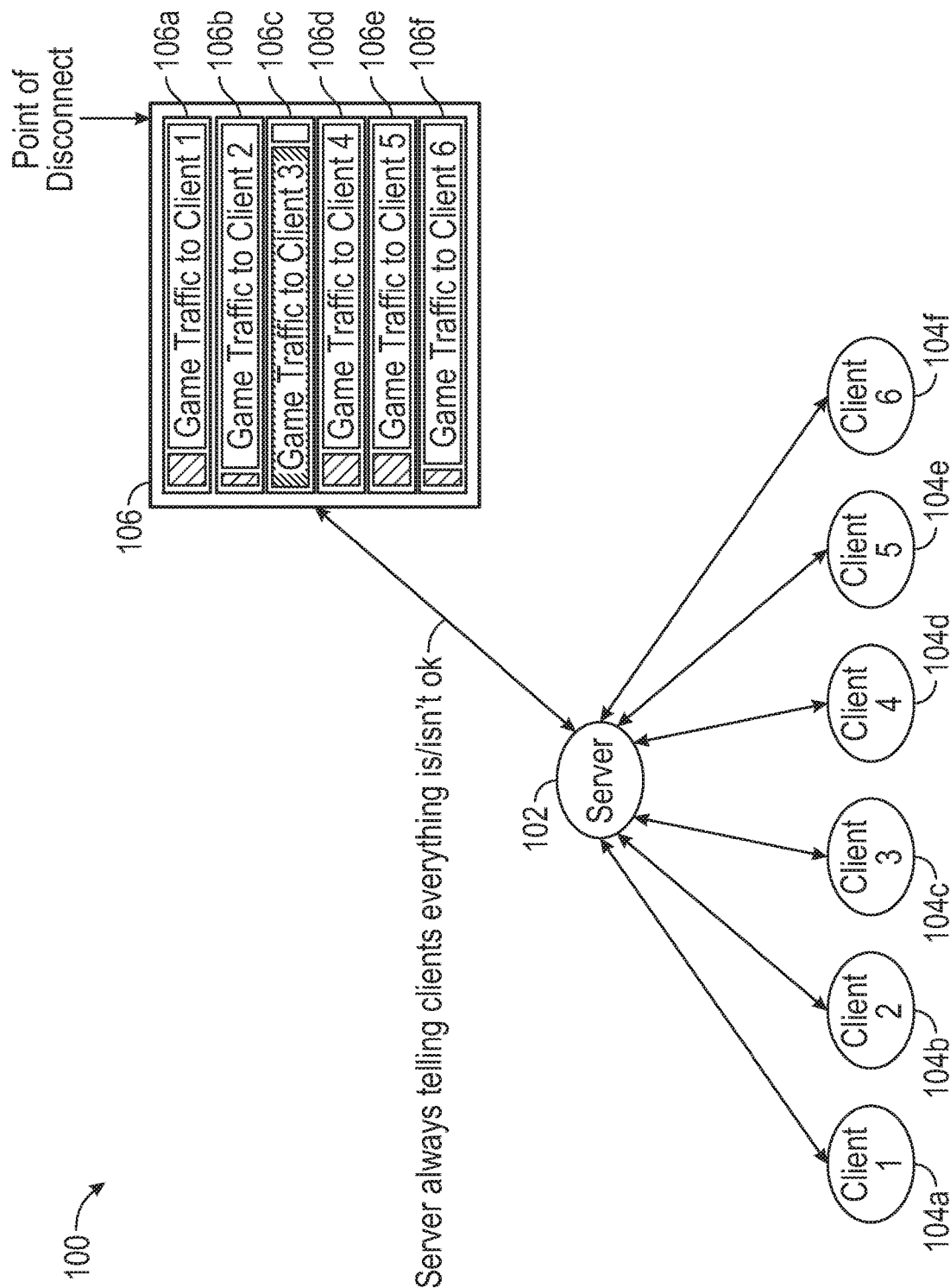
FIG. 1 illustrates an example system suitable for improving multiplayer gameplay continuity by monitoring, according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed systems, methods, and machine-readable media address a problem in traditional multiplayer games, namely inadequate support for situations where a user lags or disconnects from the game. This is a problem specifically arising in the realm of computer technology. The problem is addressed by providing a solution also rooted in computer technology, namely, by providing for improved multiplayer gameplay continuity.

The subject technology provides advantages such as improved gaming experience by preventing a player from disconnecting from a game, which improves player satisfaction that leads to higher retention, which leads to better monetization. The subject system provides additional advantages, including a smoother gaming experience and reduced system resources.

As used herein, the term "frame" generally refers to an image of a video sequence. In some systems, such as interleaved displays, the frame may include multiple fields or more complex constructs, but generally a frame represents a view into a computer-generated scene at a particular time or short time window. For example, with 35 frame-per-second video, if one frame represents the scene at t=0, then the next frame would represent the scene at t=1/35 second. In some cases, a frame may represent the scene from t=0 to t=1/35, but in a simple case, the frame is a snapshot in time.

Example System for Improving Multiplayer Gameplay Continuity

In multiplayer games, especially games involving deterministic simulation such as sports games, each client ideally executes the exact same inputs. For example, if a player executes an action through a first client, a second client should also know that the first action was executed. If the gameplay data becomes desynced, the players end up playing separate games, which is undesirable.

Ensuring that gameplay remains in-sync becomes even more important in games involving multiple characters (e.g., three or more characters), such as sports games (e.g., football, soccer, baseball, etc.). As a result, it is important that all of the players are in-sync with each other from the beginning and throughout the rest of the gameplay to avoid a situation where data is sent back and forth between the players to keep the players in-sync, which can become resource intensive and costly.

Aspects of the present disclosure provide for improving multiplayer gameplay continuity. By monitoring a game-state of a player and detecting when a user is falling behind, the user may be allowed to recover without affecting other users in a game session. A user's risk of disconnecting may also be assessed to determine if a game should be stopped or paused until the user can rejoin.

FIG. 1 illustrates an example system 100 suitable for improving multiplayer gameplay continuity by monitoring, according to certain aspects of the disclosure. The system 100 includes a server 102 communicatively coupled to clients 104*a*, 104*b*, 104*c*, 104*d*, 104*e*, and 104*f*. It is understood that although one server 102 and six clients 104*a*-104*f* are illustrated, more servers and clients may be implemented. For example, each of the clients 104*a*-104*f* may be connected to a multiplayer game at the same time through the server 102, such that the clients 104*a*-104*f* are all interacting with each other. The server 102 constantly processes all game data, which includes controller inputs for each of the players through their respective clients 104*a*-104*f*.

The server 102 monitors game traffic of each client 104-104*f* through buffers 106. For example, buffers 106*a*, 106*b*, 106*c*, 106*d*, 106*e*, and 106*f* correspond to clients 104*a*, 104*b*, 104*c*, 104*d*, 104*e*, and 104*f*, respectively. The server 102 may continuously monitor each buffer 106*a*-106*f* and may continuously communicate to each client 104*a*-104*f* whether everything is going smoothly and/or if one or more clients 104*a*-104*f* are experiencing a lag in their game traffic. In this way, the server 102 may determine whether one or more clients 104*a*-104*f* are in danger of being disconnected.

According to an aspect of the present disclosure, the server 102 detects that buffer 106*c* (e.g., a first buffer) of client 104*c* (e.g., a first client) is experiencing lag. For example, buffer 106*c* is over a threshold and is dangerously close to being out of buffering availability, at which point client 104*c* will become disconnected. The threshold may be 75% or more of a total available buffer size. As illustrated, each of buffers 106*a*, 106*b*, 106*d*, 106*e*, and 106*f* are below 15%, which is considered healthy. Buffer 106*c* is over 75% (e.g., less than a second until disconnect), and close to 100% (e.g., the buffer is full), which is considered unhealthy and can lead to disconnection from the server 102. It is understood that these thresholds are exemplary only, and other thresholds are permitted. Once the server 102 detects that buffer 106*c* is in trouble, the server 102 will notify all of the clients 104*a*-104*f* that client 104*c* is in trouble. For example, the server 102 may send a notification to all of the clients 104*a*-104*f* regarding client 104*c* being in trouble. The notification may be unseen to the players, or may be displayed as an in-game message.

Depending on an in-game status, the clients 104*a*-104*f* will automatically determine whether to let client 104*c* catch up. For example, if the in-game status is during a portion of gameplay that would interrupt the gaming experience for the other players, such as during a play in a football game, the clients 104*a*-104*f* may elect to not allow client 104*c* to catch up. If that is the case, then client 104*c* may become disconnected once buffer 106*c* fills up, and client 104*c* will have to reconnect or resync later. Disconnecting client 104*c* will not affect the continuity of gameplay for the other players.

If the in-game status is during a portion of gameplay that will not interrupt the gaming experience, such as during a timeout or otherwise stoppage of game action, then the clients 104*a*-104*f* will elect to allow client 104*c* to catch up. Examples of additional in-game status situations is discussed below in relation to FIG. 4.

According to an aspect of the present disclosure, the server 102 checks during every frame (e.g., 35 milliseconds) how far behind each player is by monitoring the buffer 106. In an implementation, for every frame, the server 102 will notify each client 104a-104f and let each client 104a-104f know whether they are in healthy state or in an unhealthy state. For example, each of clients 104a, 104b, 104d, 104e, and 104f are notified that they are in a healthy state, and client 104c is notified that it is in an unhealthy state. The notifications may be unseen to the players, or may be displayed as an in-game message.

According to aspects, the server 102 knows how many inputs each player has consumed, and where each client 104a-104f is relative to a game state of the server 102 (e.g., two seconds off). The server 102 is able to detect that the buffers 106a-106f that store the data begin to fill up. According to an aspect, the server 102 may determine that a user is at risk of disconnecting by monitoring a status of each buffer 106a-106f. For example, if the buffer 106a-106f is at a certain threshold (e.g., greater than 25% used), then the user is at risk. If the buffer 106a-106f is at a greater threshold (e.g., greater than 50% used), then the user is at higher risk. If the buffer 106a-106f is at a highest threshold (e.g., greater than 75% used), then the user is at highest risk. According to an aspect, if the user reaches the highest risk, then the server 102 will attempt to pause the game state. It is understood that these thresholds are exemplary only, and other thresholds are permitted.

According to aspects of the present disclosure, a player may fall behind for many reasons, including but not limited to, specific or generic sets of problems that includes latency in the network, network silence, unexpected network occurrence, slow frames, etc. Regardless of the reason for the player falling behind, the system 100 will detect whether the player is in a healthy or unhealthy state.

Figure 2:
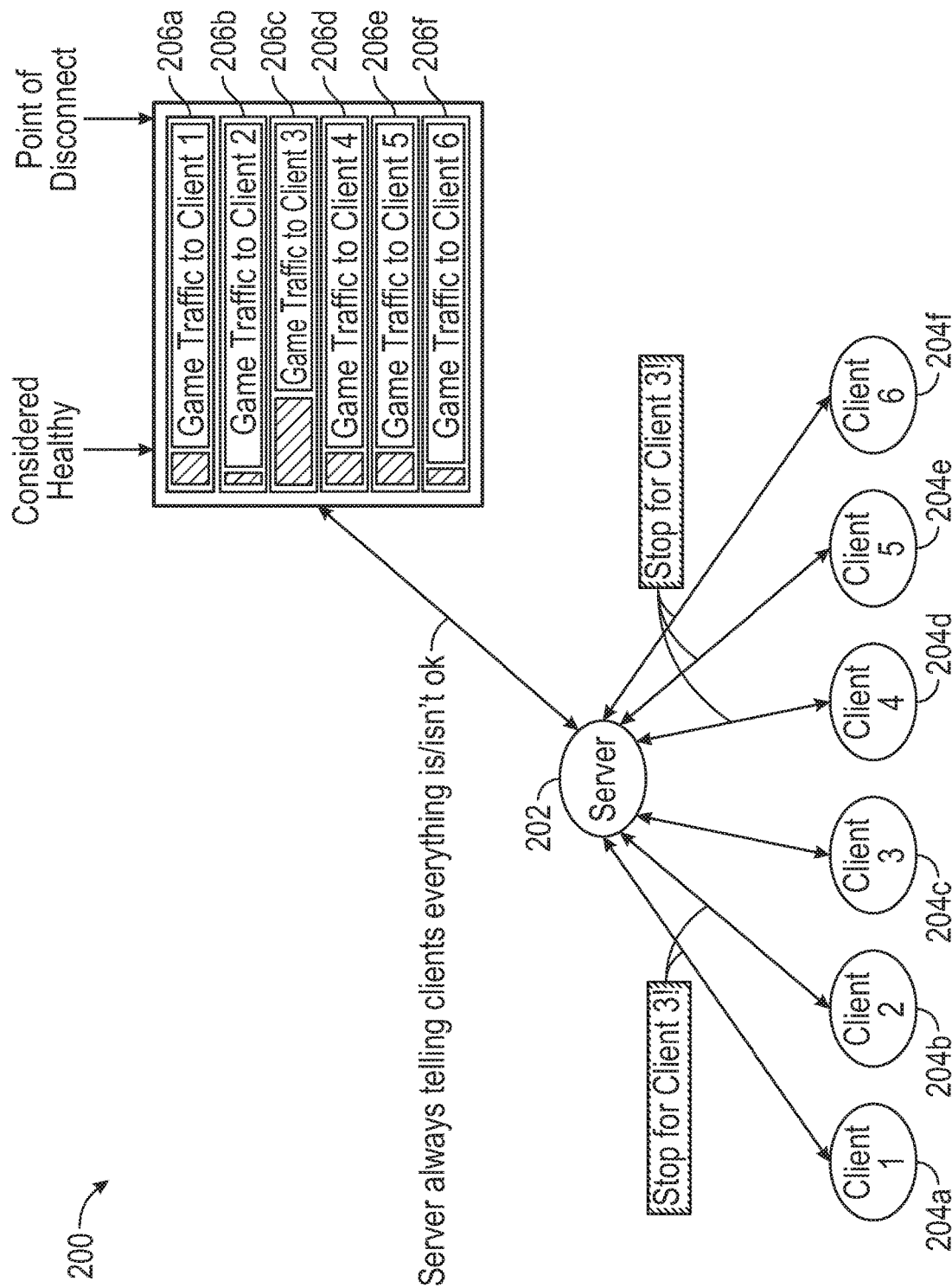
FIG. 2 illustrates an example system suitable for improving multiplayer gameplay continuity by stopping/pausing gameplay, according to certain aspects of the disclosure.

FIG. 2 illustrates an example system 200 suitable for improving multiplayer gameplay continuity by pausing/stopping gameplay, according to certain aspects of the disclosure. The system 200 includes a server 202 communicatively coupled to multiple clients 204a, 204b, 204c, 204d, 204e, and 204f. The server 202 monitors buffers 206a, 206b, 206c, 206d, 206e, and 206f, which correspond to clients 204a-204f, respectively. For example, the server 202 may monitor the clients 204a-204f and the buffers 206a-206f similarly to system 100 in FIG. 1. In this way, the server 202 may determine that client 204c is in trouble, and may notify clients 204a-204f that client 204c is in trouble. The clients 204a-204f then collectively determine whether to allow client 204c to catch up. For example, if allowing client 204c to catch up would not interfere with an in-game status, then clients 204a-204f return a notification to the server 202 notifying the server 202 that client 204c is allowed to catch up.

According to an aspect of the present disclosure, each client 204a-204f responds to the server 202 with the same response of allowing client 204c to catch up. This is to help client 204c recover as fast as possible while impacting gameplay as little as possible. For example, the moment each client 204a-204f receives a message that someone's in trouble, each client 204a-204f will make a determination of whether an in-game status is favorable or unfavorable to allowing the player to catch up. If the in-game status is favorable, then each client 204a-204f notifies the server 202 that the gameplay may be paused for all clients except client 204c.

The server 202 receives the notifications of gameplay stoppage from the clients 204a-204f, and pauses/stops the gameplay for each client except client 204c. The server 202 then continues to process game data normally while the buffer 206c of client 204c drains and all the other clients 204a, 204b, 204d, 204e, and 204f wait. In this way, client 204c will receive data that it had been falling behind on, and it will process that data. The server 202 also continues to monitor the buffers 206a-206f, and once buffer 206c reaches a point where it is in a healthy state (e.g., 15% or less of buffer space used), the rest of the clients 204a-204f resume gameplay. For example, the client 204c may indicate to the server 202 that it is in a healthy state, and/or the server 202 may detect that the client 204c is in a healthy state. The server 202 then resumes standard monitoring and processing of data for the clients 204a-204f.

According to an aspect of the present disclosure, the notification from the server 202 may be, for example, a pop-up message in the center of the screen. The pop-up message may be server configurable and tailored to what is happening regarding the clients 204a-204f. For example, a sample notification from the server 202 may include language similar to, "Waiting for your opponent," "Waiting for another player to catch up," "Player [X] disconnected," "Waiting for player [X]," "There's a player rejoining the game, please wait," etc. It is understood that other language may be used to relay similar messages.

According to an aspect of the present disclosure, the client falling behind (e.g., client 204c in FIG. 2) may receive a directed notification from the server 202, letting the client know that it is falling behind. For example, the notification may resemble, "You have lost connection," "Trying to reconnect you," etc. It is understood that other language may be used to relay similar messages. In this way, the system 200 may be very explicit to the users as to whether they are the one who is falling behind, or whether they are being polite in waiting for somebody who is falling behind to catch back up. Thus, a user who has a bad connection will know they are causing the delays, and may motivate that user to address their connection issues.

A situation may occur where there is a complete loss of network traffic from the server 202 to the client (e.g., client 204c), which prevents the client from receiving a notification from the server 202 that the client is at fault for causing delays. Upon not hearing anything or receiving any data from the server 202 for a configured amount of time (e.g., one second), the client will assume there is a total network interruption and would potentially display the directed notification (e.g., based on configurations) in parallel to the other clients, which are determining if the client at fault is in a state to be allowed to catch up. In this instance, the client that is having the issue would proceed as such until the client is disconnected or starts to receive data from the server 202, at which point the client will resume performing instructions from the server 202 (e.g., catching up, etc.).

In an implementation, masking is utilized to maintain fluidity of the gaming experience. For example, while a user is trying to rejoin or catch back up, the system 200 will notify users of whether or not they are at fault for causing the delay. Additionally, animation may be simultaneously displayed to keep the gaming experience fluid, while also being open about the fact that gameplay is being stopped/paused. Example animations may include cutting to a sideline shot, showing a presentation, animations of the players, commercials, etc. As a result, the stoppage in gameplay would resemble a real-life stoppage in a sporting event, for example. At the same time, users who are at fault for the stoppage will know they are at fault for causing the stoppage.

According to an aspect, if an in-game status is unfavorable to allowing a client to catch up, the server 202 will wait for a moment in gameplay that is favorable before stopping/pausing gameplay. For example, the server 202 may send out a message that a user is falling behind. If the in-game status is unfavorable, the clients 204a-204f will not allow gameplay to be paused. The server 202 may then wait for a better moment and sends out a high priority message asking for a stoppage. Once the clients 204a-204f allow the user to catch up, it is treated as a critical priority. For example, after the high priority message goes back out and the user starts to catch up. The client that is catching up may enter a "catch-up mode," which may be an optimized version of gameplay that simulates everything as fast as possible. This is because standard gameplay has a cap on how fast a client can run, in order to create a smooth user experience without visual jarring, etc. During "catch-up mode," the cap is removed, and the gameplay is allowed to execute as fast as possible. This allows for the user to catch up very quickly (e.g., half a second). Aside from seeing the message and reading the message, the user would not have noticed that something had happened.

According to additional aspects, the system 200 is able to handle multiple situations simultaneously. For example, if multiple clients (e.g., clients 204a and 204c) are in danger of being disconnected, the server 202 will send out notifications that multiple clients are in trouble. All the clients get notified of the situation, and as long as it is a good time to catch up, the multiple clients can all catch up at the exact same time. Everything may be accomplished in parallel for maximum efficiency. If a first client catches up faster than a second client, then all clients 204a-204f will be notified of the first client catching up. Then everyone will wait for the second client to catch up, and be notified of that they are waiting for the second client.

The server 202 may also track user latency, jitter, packet loss, bandwidth limitations, etc., in addition to the buffers 206a-206f. For example, while sending information from the server 202 to the clients 204a-204f, the system 200 may detect that a specific client is having a harder time processing data. Before the client is in danger of disconnecting, the server 202 may send the client different data than what was sent to the other clients. For example, the system 200 may package and bundle data, and send the data faster to the other clients, to help keep some clients from falling behind.

The disclosed system 200 allows users to maintain connectivity to a multiplayer game even if a user disconnects, or is at danger of disconnecting. As described herein, a user may disconnect for many reasons, including situations where there is no traffic occurring, when a client falls behind, landline connectivity issues, loss of signal, a bug in the gaming software, etc. Even though a user may experience certain issues in a game, the described system 200 allows the user to get back in the game as fast as possible.

Figure 3:
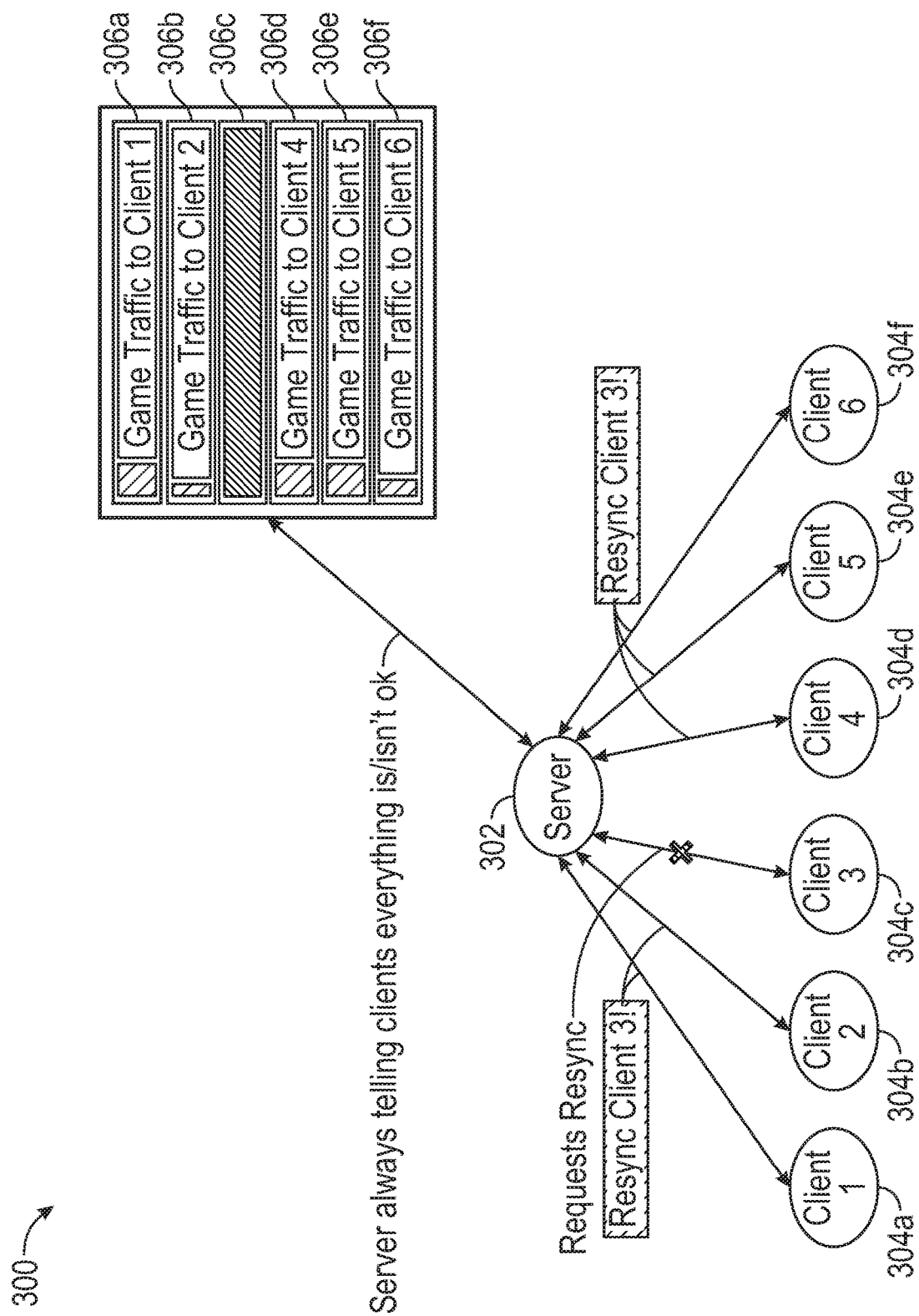
FIG. 3 illustrates an example system suitable for improving multiplayer gameplay continuity by resyncing, according to certain aspects of the disclosure.

FIG. 3 illustrates an example system 300 suitable for improving multiplayer gameplay continuity by resyncing, according to certain aspects of the disclosure. The system 300 includes a server 302 communicatively coupled to multiple clients 304a, 304b, 304c, 304d, 304e, and 304f. The server 302 monitors buffers 306a, 306b, 306c, 306d, 306e, and 306f, which correspond to clients 304a-304f, respectively. For example, the server 302 may monitor the clients 304a-304f and the buffers 306a-306f similarly to system 100 in FIG. 1. In this way, the server 302 may determine that client 304c is in trouble, and may notify clients 304a-304f that client 304c is in trouble. The clients 304a-304f then collectively determine whether to allow client 304c to catch up. For example, if allowing client 304c to catch up would not interfere with an in-game status, then clients 304a-304f return a notification to the server 302 notifying the server 302 that client 304c is allowed to catch up.

According to an aspect, client 304c may become disconnected without having an opportunity to catch up. For example, client 304c may be disconnected when they intentionally leave the game, lose power, the other clients did not wait for them to catch up, etc. In this situation, client 304c may resync with the server 302 at a point in gameplay. For example, the client 304c sends a notification to the server 302 that it wishes to reconnect to the active game. The server 302 receives the notification, and notifies the other clients 304a-304f that client 304c wishes to rejoin the game. Similar to the above described situations in FIGS. 1 and 2, once the game progresses to a state where it is favorable for resyncing, all the clients 304a-304f notify the server 302 that it may resync client 304c. The server 302 then pings client 304c and resyncs client 304c back into the game. In an implementation, the server 302 may resync client 304c without having to wait for a favorable moment in gameplay.

FIG. 4 is an example chart 400 of in-game status scenarios, according to certain aspects of the disclosure. These are example scenarios of when it would be favorable or unfavorable to stopping/pausing gameplay to allow a user to catch up (e.g., save the user). For example, if the in-game status is during a play-call scenario (e.g., in between on-field action), as in a football game, it would be favorable to save the user. If the in-game status is in the middle of a play or a kick meter is showing (e.g., for a football game), then it is not favorable to save the user.

According to an aspect, if the user has cumulatively taken longer than one minute of game time, then it would be unfavorable to save the user. Additionally, if the user has already been saved at least three time, then it would be unfavorable to save the user. These two scenarios are to protect against a situation where the user has a bad connection that is disrupting gameplay, a bad actor attempting to cause lag, etc. In an implementation, the user may receive a message advising them to reboot and/or check their network connections.

Additional example of favorable circumstances include, but are not limited to, after a play, when the ball goes out of bounds, if a foul is committed, whenever a ball goes to the hoop for a basketball game, before or after a pitcher throws a pitch for a baseball game, during a timeout, etc.

FIGS. 5A-5B illustrate example configurations for implementing the example systems of FIGS. 1-3. Referring to FIG. 5A, example system configurations 500 may include allowing for multiple versions of the settings to exist, enabling a recovery system (e.g., as described above in FIGS. 1-3), allowing a player to recover during play, allowing a player to recover during a kick, enabling recovery in head-to-head (H2H), enabling recovery in online team play (OTP)/squad mode, maximum recoveries per user in H2H, maximum recoveries per user in OTP/squad mode, maximum recovery time per catch-up instance before continuing the game (e.g., helps prevent grieving), notifying at-fault user, catch-up threshold, at fault text displayed in a message, message shown to users waiting for a user to catch up in H2H, and message shown to user that waiting for a user to catch up in OTP/squad mode.

Referring to FIG. 5B, example system configurations 550 may include threshold for notification, enabling a latency icon, connection not great threshold for latency icon, bad connection threshold for latency icon, maximum catch-up time per game, resync enabled, maximum resyncs per user in H2H, maximum resyncs per user in OTP/squads, resync on disconnect, resync on desync, resync on crash, matchmake into existing game, and spectator enabled.

It is understood that the configuration settings described in FIGS. 5A-5B are exemplary only, and other configuration settings may be implemented.

The configurations described in FIGS. 5A-5B may be adjusted and/or toggled through a configuration menu through a server. For example, the server may adjust the settings prior to gameplay. The settings may be adjusted according results of a previous game to further optimize gameplay. For example, all of the above-described configuration settings may be configurable via a configuration file on a server. The configurations settings may be tuned at any time without patches or updates to the game software. The server then deploys the configuration settings to be used by the clients.

According to an aspect, the server sets the configurations at the beginning of each game, when all the players are loading into the game. Once in the game, the settings do not change. According to an aspect, the server may further update configuration settings according to what occurred during gameplay. For example, if a certain client is constantly having issues, then the server may limit an amount of times to save that client.

In an implementation, the server may anticipate problems with a client based on previous games. For example, the server may implement configuration settings (e.g., thresholds may be more or less generous) to achieve smoother gameplay. According to an aspect, the server may be more likely to disconnect a player if their connection is always slow, or more likely to cause them to recover earlier if their connection is uncharacteristically slow.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
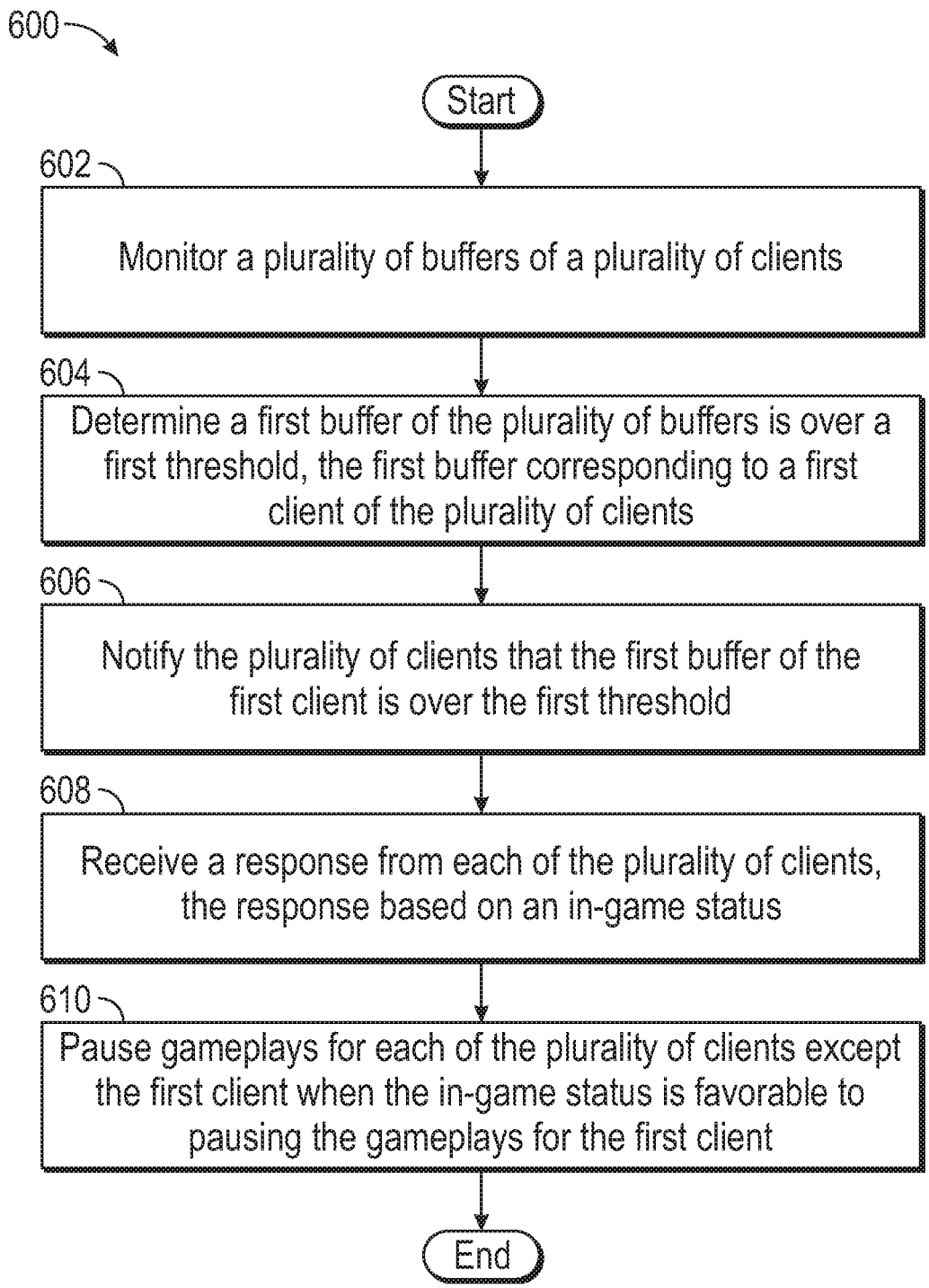
FIG. 6 illustrates an example flow diagram for improving multiplayer gameplay continuity, according to certain aspects of the disclosure.

FIG. 6 illustrates an example flow diagram (e.g., process 600) for improving multiplayer gameplay continuity, according to certain aspects of the disclosure. For explanatory purposes, the example process 600 is described herein with reference to the systems 100, 200, and 300 of FIGS. 1-3. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed. For purposes of explanation of the subject technology, the process 600 will be discussed in reference to FIGS. 1-3.

At block 602, multiple buffers of multiple clients are monitored by a server. At block 604, a first buffer is determined to be over a first threshold, the first buffer corresponding to a first client. At block 606, clients are notified that the first buffer of the first client is over the first threshold. At block 608, a response is received from each of the clients, the response based on an in-game status. At block 610, gameplays are paused for each of the clients except the first client when the in-game status is favorable to pausing the gameplays for the first client.

According to an aspect, the process 600 further includes resuming gameplays for all of the plurality of clients when the first buffer is below a second threshold, the second threshold different from the first threshold.

According to an aspect, the process 600 further includes continuing gameplays for each of the plurality of clients when the in-game status is unfavorable to pausing the gameplays for the first client.

According to an aspect, the process 600 further includes determining a second client of the plurality of clients is disconnected, and resyncing the second client at a resync point when the second client is disconnected.

According to an aspect, the process 600 further includes pausing the gameplays until the first buffer is below a second threshold, the second threshold different from the first threshold.

According to an aspect, the process 600 further includes adjusting configuration settings based on monitoring the plurality of buffers.

According to an aspect, the process 600 further includes displaying a message to each of the plurality of clients regarding pausing the gameplays for the first client.

According to an aspect, the process 600 further includes displaying a message to the first client notifying the first client that the first buffer is over the first threshold.

According to an aspect, the process 600 further includes delaying pausing of the gameplays until the in-game status is favorable to pausing the gameplays for the first client.

Hardware Overview

Figure 7:
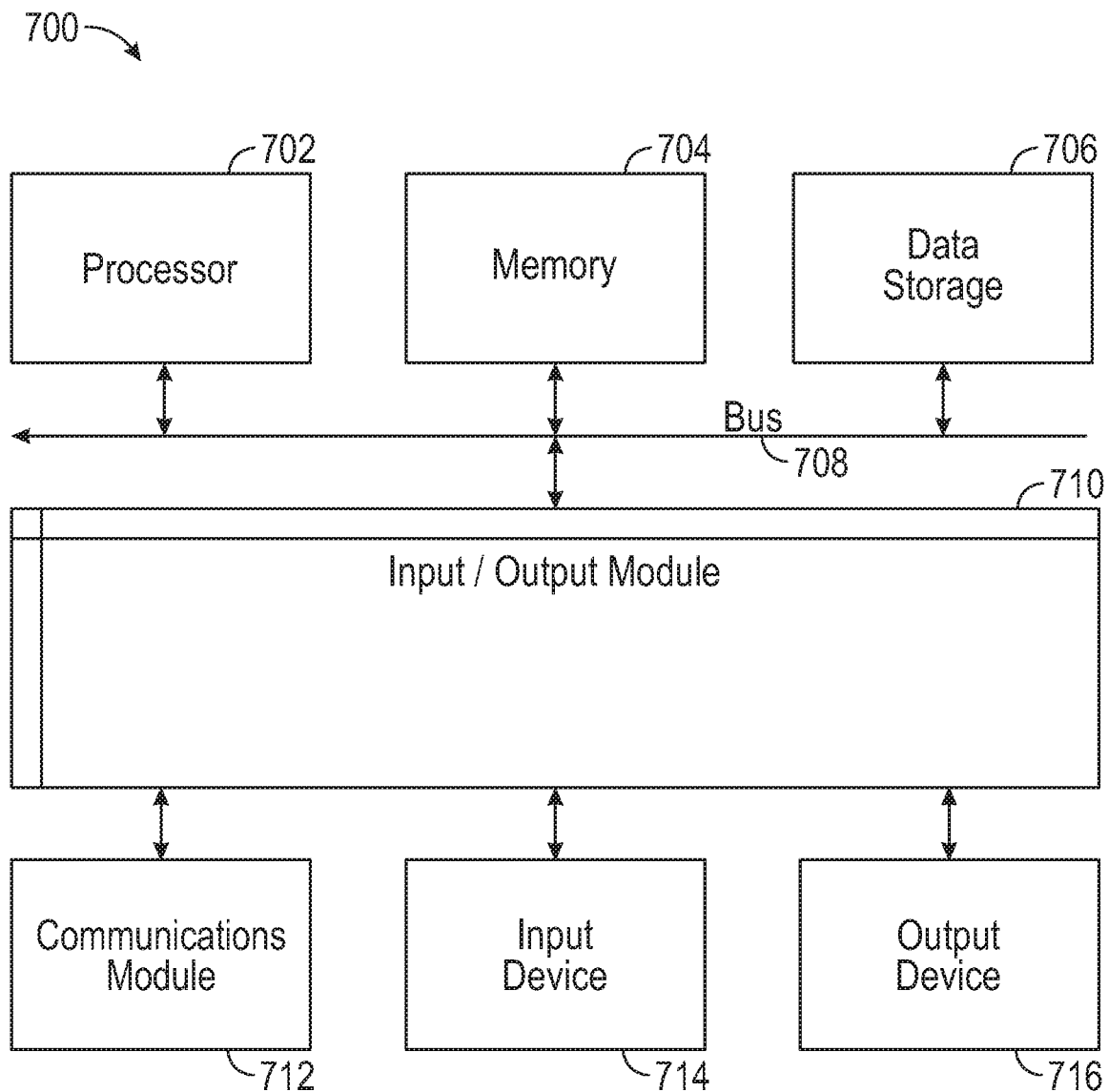
FIG. 7 is a block diagram illustrating an example computer system with which aspects of the subject technology can be implemented.

FIG. 7 is a block diagram illustrating an exemplary computer system 700 with which the systems 100, 200, and 300 of FIGS. 1-3 can be implemented. In certain aspects, the computer system 700 may be implemented using hardware or a combination of software and hardware, either in a dedicated server, integrated into another entity, or distributed across multiple entities.

Computer system 700 includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, for example, code that constitutes processor firmware, a protocol stack, a database management system, an operating system, or a combination of one or more of them stored in an included memory 704, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as a LCD (liquid crystal display) monitor, for displaying information to the user.

According to one aspect of the present disclosure, the systems 100, 200, and 300 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for improving multiplayer gameplay continuity, comprising:
    monitoring a plurality of buffers of a plurality of clients;
    determining a first buffer is over a first threshold, the first buffer corresponding to a first client;
    notifying the plurality of clients that the first buffer of the first client is over the first threshold;
    receiving a response from each of the plurality of clients, the response based on an in-game status; and
    pausing gameplays for each of the plurality of clients except the first client when the in-game status is favorable to pausing the gameplays for the first client.

2. The computer-implemented method of claim 1, further comprising:
    resuming gameplays for all of the plurality of clients when the first buffer is below a second threshold, the second threshold different from the first threshold.

3. The computer-implemented method of claim 1, further comprising:
    continuing gameplays for each of the plurality of clients when the in-game status is unfavorable to pausing the gameplays for the first client.

4. The computer-implemented method of claim 1, further comprising:
    determining a second client of the plurality of clients is disconnected; and
    resyncing the second client at a resync point when the second client is disconnected.

5. The computer-implemented method of claim 1, wherein the gameplays are paused until the first buffer is below a second threshold, the second threshold different from the first threshold.

6. The computer-implemented method of claim 1, further comprising:
    adjusting configuration settings based on monitoring the plurality of buffers.

7. The computer-implemented method of claim 1, further comprising:
    displaying a message to each of the plurality of clients regarding pausing the gameplays for the first client.

8. The computer-implemented method of claim 1, further comprising:
    displaying a message to the first client notifying the first client that the first buffer is over the first threshold.

9. The computer-implemented method of claim 1, further comprising:
    delaying pausing of the gameplays until the in-game status is favorable to pausing the gameplays for the first client.

10. A system for improving multiplayer gameplay continuity comprising:
    a memory storing sequences of instructions; and
    a processor configured to execute the sequences of instructions which, when executed, causes the processor to perform:
        monitoring a plurality of buffers of a plurality of clients;
        determining a first buffer is over a first threshold, the first buffer corresponding to a first client;

notifying the plurality of clients that the first buffer of the first client is over the first threshold;

receiving a response from each of the plurality of clients, the response based on an in-game status; and pausing gameplays for each of the plurality of clients except the first client when the in-game status is favorable to pausing the gameplays for the first client.

11. The system of claim 10, further comprising stored sequences of instructions, which when executed by the processor, cause the processor to perform:

resuming gameplays for all of the plurality of clients when the first buffer is below a second threshold, the second threshold different from the first threshold.

12. The system of claim 10, further comprising stored sequences of instructions, which when executed by the processor, cause the processor to perform:

continuing gameplays for each of the plurality of clients when the in-game status is unfavorable to pausing the gameplays for the first client.

13. The system of claim 10, further comprising stored sequences of instructions, which when executed by the processor, cause the processor to perform:

determining a second client of the plurality of clients is disconnected; and resyncing the second client at a resync point when the second client is disconnected.

14. The system of claim 10, wherein the gameplays are paused until the first buffer is below a second threshold, the second threshold different from the first threshold.

15. The system of claim 10, further comprising stored sequences of instructions, which when executed by the processor, cause the processor to perform:

adjusting configuration settings based on monitoring the plurality of buffers.

16. The system of claim 10, further comprising stored sequences of instructions, which when executed by the processor, cause the processor to perform:

displaying a message to each of the plurality of clients regarding pausing the gameplays for the first client.

17. The system of claim 10, further comprising stored sequences of instructions, which when executed by the processor, cause the processor to perform:

delaying pausing of the gameplays until the in-game status is favorable to pausing the gameplays for the first client.

18. A non-transitory computer readable storage medium is provided including instructions that, when executed by a processor, cause the processor to perform a method for improving multiplayer gameplay continuity, the method comprising:

monitoring a plurality of buffers of a plurality of clients;

determining a first buffer is over a first threshold, the first buffer corresponding to a first client;

notifying the plurality of clients that the first buffer of the first client is over the first threshold;

receiving a response from each of the plurality of clients, the response based on an in-game status; and pausing gameplays for each of the plurality of clients except the first client when the in-game status is favorable to pausing the gameplays for the first client.

19. The non-transitory computer readable storage medium of claim 18, wherein the method further comprises:

resuming gameplays for all of the plurality of clients when the first buffer is below a second threshold, the second threshold different from the first threshold.

20. The non-transitory computer readable storage medium of claim 18, wherein the method further comprises:

continuing gameplays for each of the plurality of clients when the in-game status is unfavorable to pausing the gameplays for the first client.

* * * * *